Feb. 13, 1962 G. W. LEAVESLEY ETAL 3,020,785
DUAL STEEL RULE BLANKING DIE AND METHOD OF MAKING IT
Filed April 7, 1958 3 Sheets-Sheet 1
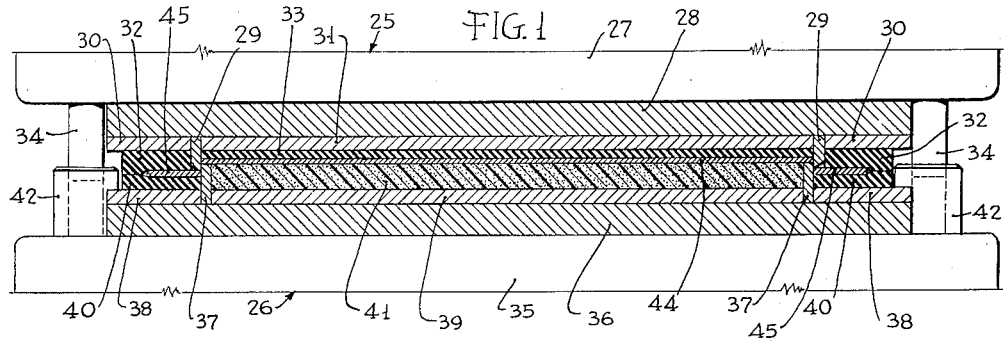
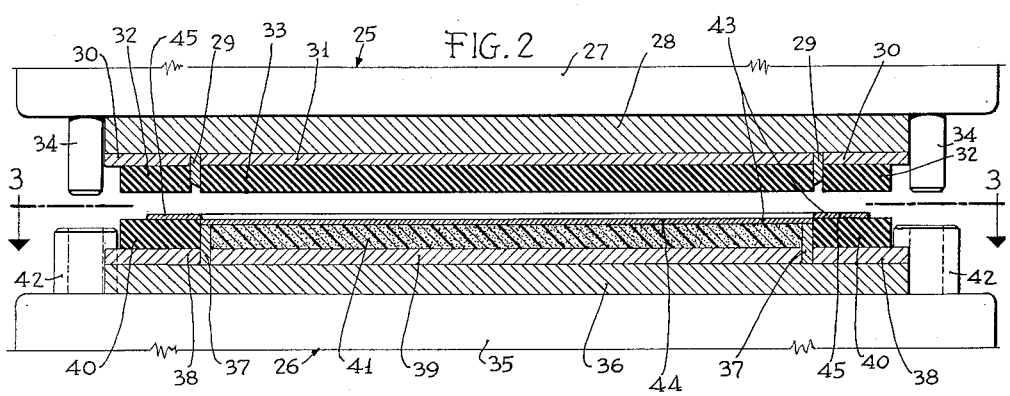
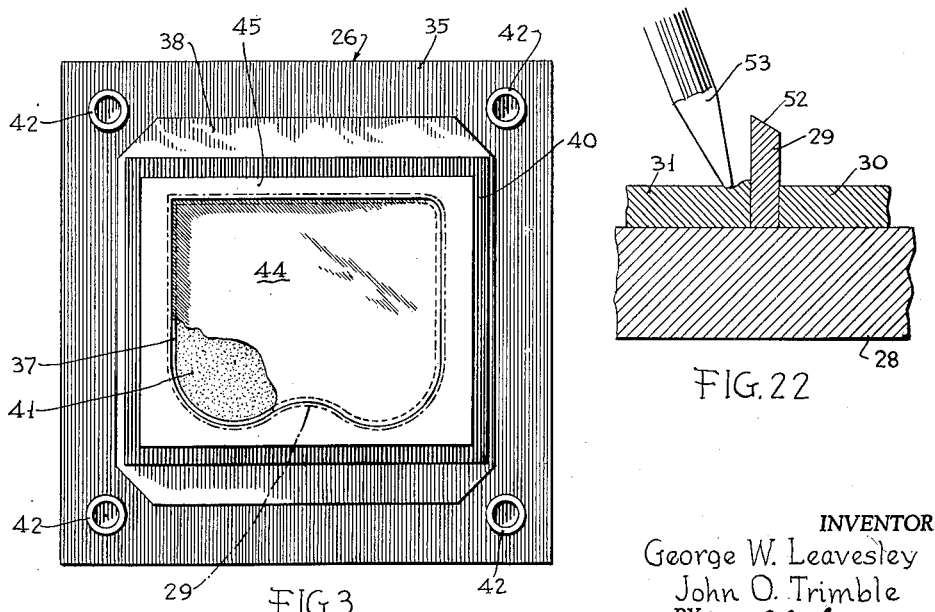
INVENTORS
George W. Leavesley
John O. Trimble
BY Karl L. Schiff
AGENT Feb. 13, 1962　　G. W. LEAVESLEY ETAL　　3,020,785
DUAL STEEL RULE BLANKING DIE AND METHOD OF MAKING IT
Filed April 7, 1958　　　　　　　　　　　　　　　3 Sheets-Sheet 2
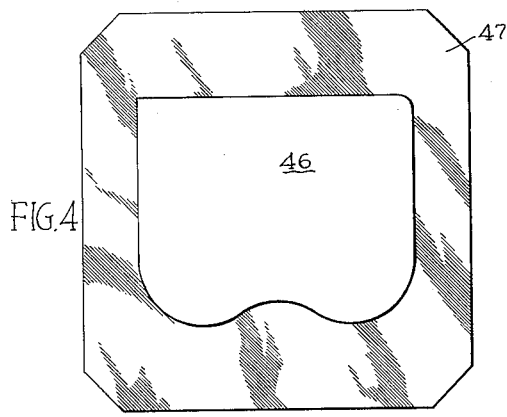
FIG.4
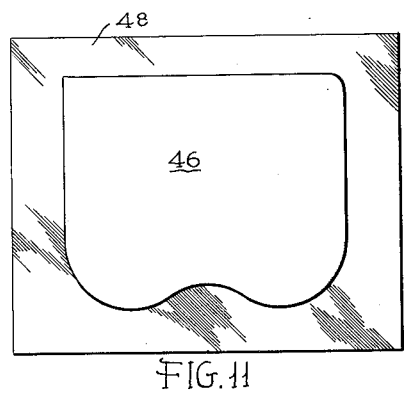
FIG.11
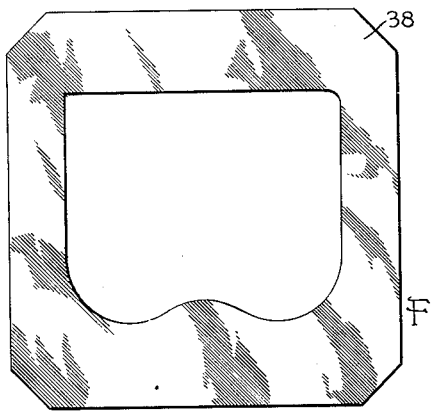
FIG.5
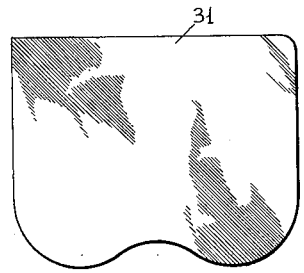
FIG.12
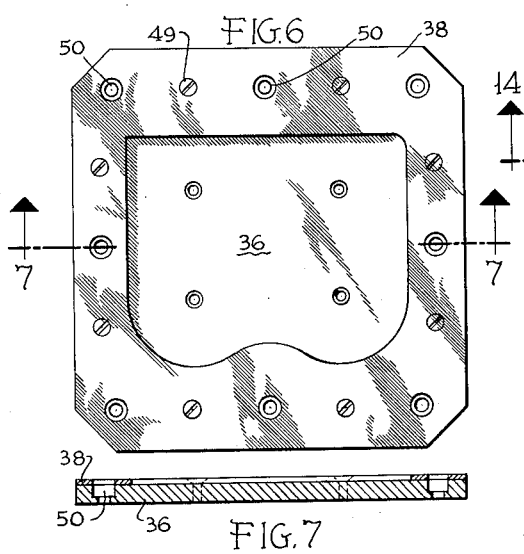
FIG.6
FIG.7
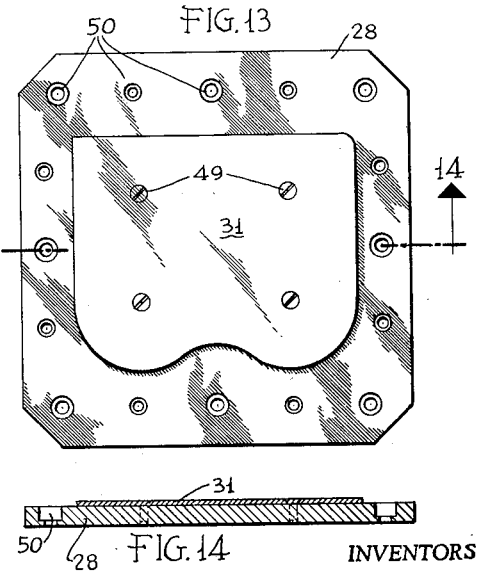
FIG.13
FIG.14
INVENTORS
George W. Leavesley
John O. Trimble
BY Karl L. Schiff
AGENT

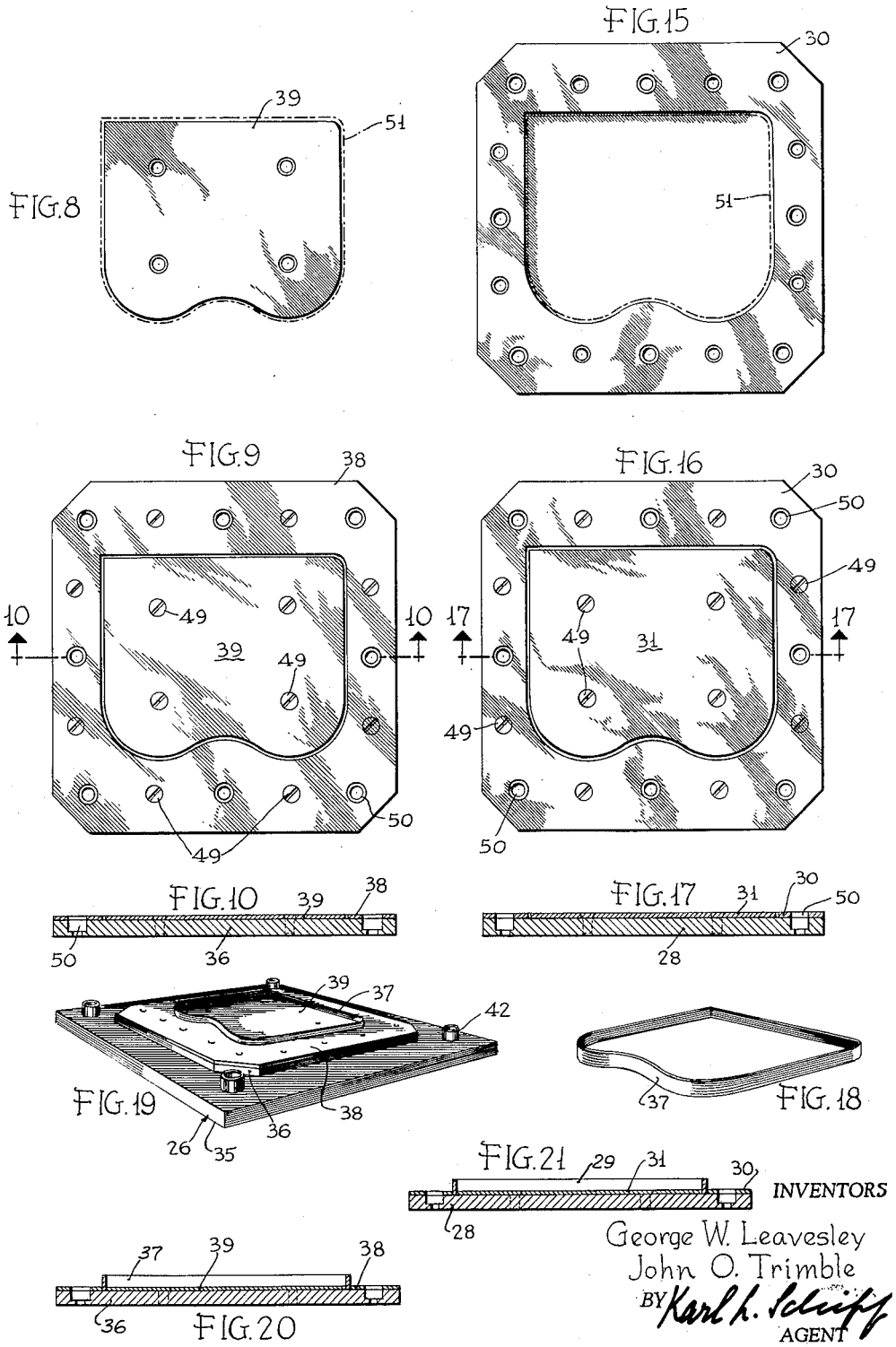

United States Patent Office 3,020,785
Patented Feb. 13, 1962

3,020,785
DUAL STEEL RULE BLANKING DIE AND METHOD OF MAKING IT
George W. Leavesley, Levittown, and John O. Trimble, Havertown, Pa., assignors to The Budd Company, Philadelphia, Pa., a corporation of Pennsylvania
Filed Apr. 7, 1958, Ser. No. 726,939
2 Claims. (Cl. 76—107)

The invention relates to dual steel rule blanking dies, that is dies in which a pair of cooperating supporting plates each carry a steel rule or shear blade bent to the shape of a blank to be cut therewith, the two steel rules or blades presenting the cooperating shearing edges.

Main objects of the invention are improvements in such dies and particularly improvements in the method of making them.

Among the more specific objects of the invention are method and means for increasing the accuracy of the dies of the indicated type, and for providing a die which will deliver good burr-free blanks, which can be made relatively inexpensively and quickly, and which will withstand for great length of time high production service.

The above and other objects and advantages of the invention as well as the features and details thereof will become apparent from the following description of one embodiment and from its illustration in the attached drawing.

In the drawing:

FIGS. 1 and 2 are sections through the die with a blank between their upper and lower halves, FIG. 1 showing the die in closed position and FIG. 2 in open position after having cut out a blank;

FIG. 3 is a plan view on a smaller scale of the lower half of the die, taken substantially along line 3—3 of FIG. 2;

FIGS. 4 through 10 are plan views and sections respectively illustrating the method of making the lower die plate, FIGS. 4, 5, 6, 8 and 9 being plan views and FIGS. 7 and 10 being sections respectively along line 7—7 of FIG. 6 and line 10—10 of FIG. 9;

FIGS. 11 through 17 are plan views and sections respectively corresponding to FIGS. 4 through 10 but illustrating the method of making the upper die plate, again FIGS. 11, 12, 13, 15 and 16 being plan views and FIGS. 14 and 17 being sections respectively along line 14—14 of FIG. 13 and line 17—17 of FIG. 16;

FIG. 18 is a perspective of the lower shear rule or blade before its installation;

FIG. 19 is a perspective of the lower die with the shear blade installed;

FIGS. 20 and 21 are sections corresponding to FIGS. 10 and 17 yet with the shear blades installed; and FIG. 22 is a fragmentary section through part of the upper die illustrating the procedure and means for securing the shear blade in place.

The completed die, illustrated in FIGS. 1, 2, 3 and 19 to 22, comprises an upper die 25 and a lower die 26.

Upper die 25 includes a shoe 27, a mounting or backing plate 28, a shear rule or blade 29, an outer retaining plate 30, an inner retaining plate 31, an outer resilient cushion or ejector 32, an inner resilient cushion or ejector 33, and guide posts 34.

Lower die 26 comprises correspondingly a shoe 35, a mounting or backing plate 36, a shear blade 37, and outer retaining plate 38, an inner retaining plate 39, an outer resilient cushion or ejector 40, a substantially rigid filler 41, and guide sleeves 42 cooperating with corresponding guide posts 34.

The upper shear blade 29 telescopingly fits around the lower shear blade 37. The filler 41 is flush with the upper edge of shear blade 37, whereas the resilient cushions 32, 33 and 40 project, when the die is open as shown in FIG. 2, beyond the cutting edges of the shear blades 29 and 37, respectively, and act as ejectors.

The operation of the completed die is easily understandable. A metal sheet 43 is placed on the lower die 26. When upper die 25 moves downwardly, sheet 43 is pressed against lower shear blade 37 in compressing the resilient cushions 32, 33 and 40 until upper shear blade 29 passes the upper edge of lower shear blade 37 and thereby separates the blank 44 from the marginal scrap pieces 45. Upon withdrawal of upper die 25 into the position shown in FIG. 2, the resilient cushion 40 presses the cut-off scrap 45 upwardly beyond the lower shear blade 37 so that it can easily be lifted off. Similarly, the blank 44 is carried along by upper shear blade 29 but is then pressed downwardly and out of engagement with shear blade 29 under the action of the cushion 33.

The new die is preferably made by the following method:

(a) A template 46 is shaped to the exact size of the blank to be cut by the die.

(b) The outline of template 46 is laid-out on two steel plates 47 (FIG. 4) and 48 (FIG. 11) of e.g. 3/16" gauge, and the two plates are cut and finished to the exact size of the template, the one (47) along its inner edge and the other (48) along its outer edge so as to form respectively the lower outer retaining plate 38 (FIG. 5) and the upper inner retaining plate 31 (FIG. 12).

(c) The retaining plates 38 and 31 are fitted into each other. It is most important to establish a good fit (.001" to .002" clearance) because the retaining plates determine cutting steel fit and clearance.

(d) The retaining plates 38 and 31 are secured respectively to lower and upper backing plates 36 (FIGS. 6 and 7, 13, 14) and 28 (FIGS. 13 and 14, 6, 7) by means of screws 49, and the plates 28 and 36 are provided with screw holes 50 for attachment to the die shoes 27 and 35, 39.

(e) Two further steel plates are laid-out, cut and finished respectively along their outer and inner margin along lines which are equidistant to but spaced (e.g. 1/8th inch) from the outline 51 of the template so as to form respectively the lower inner retaining plate 39 (FIG. 8) and the upper outer retaining plate 30 (FIG. 15).

(f) Cutting or shear blades 29 and 37 are bent, to conform with the outline of template 46, around respectively upper inner retaining plate 31 and lower inner retaining plate 39.

(g) Lower cutting blade 37 is hardened to 60–Rc.

(h) All retaining plates 30, 31 and 38, 39 are secured to their respective backing plates 28 and 36 holding between them the hardened lower cutting blade 37 and the soft upper cutting blade 29. Die 25, 26 is closed to shear in the upper cutting blade 29.

(i) Die 25, 26 is opened. Upper cutting blade 29 is removed, shear marks ground off, and the blade is hardened to 60–Rc.

(j) Die 25, 26 is re-assembled. Shear and bevel 52 is ground on upper cutting blade 29 (FIG. 22).

(k) Inaccuracies of the retaining plates or differences in the thickness of the steel rules may prevent certain parts of the steel rules from being firmly gripped between the retaining plates. This situation is taken care of by staking or peening, as shown in FIG. 22, the margin of one or both retaining plates in the affected region by tool 53 so as to establish firm contact.

(l) Lower die cavity is filled wtih iron-filled epoxy resin 41. Ejector or stripping means 32, 33, 40 are assembled and mounted.

Upon inspection and adjustment of die clearance, the die is now ready for tryout and use.

The invention is, of course, not restricted to the described and illustrated details but is susceptible to modifications and adaptations. For instance, the lower inner retaining plate and the upper outer retaining plate may be formed of the cut-offs remaining in forming the lower outer and the upper inner retaining plates respectively, or the lower inner and the upper outer retaining plates may be formed of one common blank. It is also possible to form the retaining plates of several pieces. Furthermore, the ejecting means may be different from those specifically illustrated and described.

What is claimed is:

1. The method of making a blade-type blanking die having a pair of co-acting rule-type shear blades, which comprises, hardening and final-mounting a first one of the co-acting blades, leaving the second blade soft and temporarily mounting it for co-action with the hardened blade, operating the blades together to shear the unhardened blade by the hardened blade, removing and hardening the unhardened blade when sheared to shape, and final-mounting the second blade.

2. The method as set forth in claim 1 which further includes as a preliminary operation, cutting steel plate blanks to substantially exact outside and inside shape of a pattern, mounting said plate blanks on backing plates, shaping said plate blanks until they fit exactly together, shaping the rule die blade blanks to the inside and outside respectively of said plate blanks, and using the plate blanks on opposite die parts for the respective die blade blanks which were made to fit them.

References Cited in the file of this patent
UNITED STATES PATENTS

| | | |
|---|---|---|
| 1,128,296 | Copony | Feb. 16, 1915 |
| 2,266,593 | Emmons | Dec. 16, 1941 |
| 2,384,229 | Ammann | Sept. 4, 1945 |
| 2,533,922 | Deichmiller et al. | Dec. 2, 1950 |
| 2,703,022 | Sarno | Mar. 1, 1955 |
| 2,791,134 | Bien | May 7, 1957 |
| 2,801,696 | Banko | Aug. 6, 1957 |